June 17, 1958 H. O. SMITH 2,839,161
PRESSURE LUBRICATING SYSTEM
Filed Oct. 14, 1954
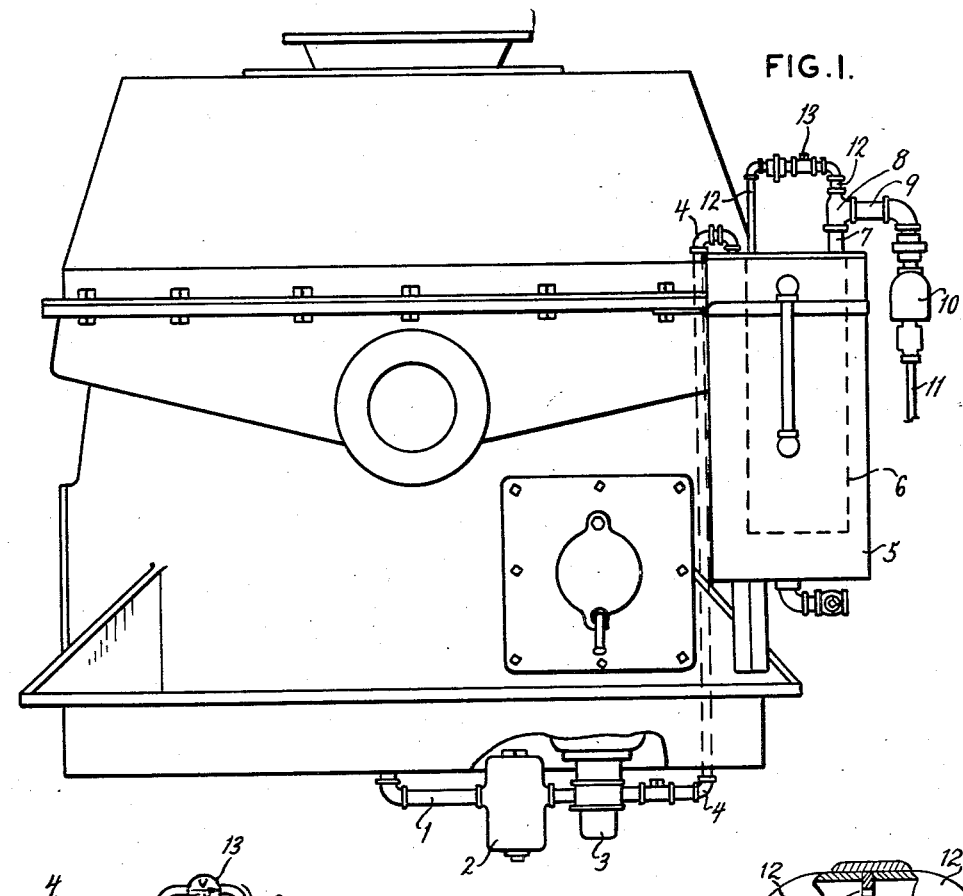
FIG. 1.
FIG. 3.
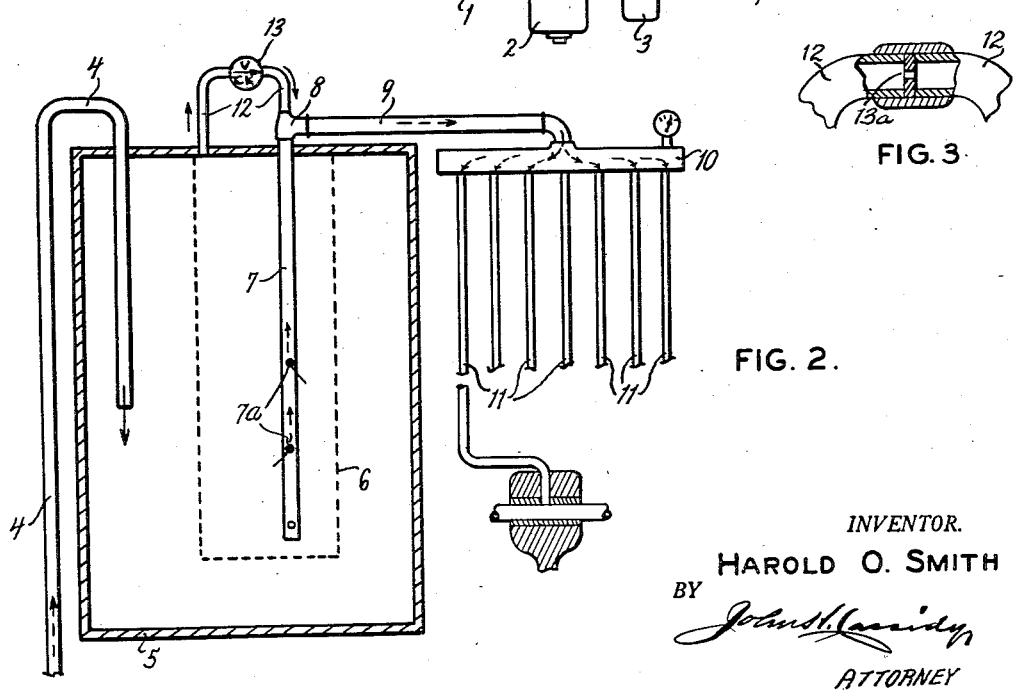
FIG. 2.
INVENTOR.
HAROLD O. SMITH
BY
*John H. Cassidy*
ATTORNEY

United States Patent Office 2,839,161
Patented June 17, 1958

2,839,161

PRESSURE LUBRICATING SYSTEM

Harold O. Smith, Kirkwood, Mo., assignor to Centrifugal & Mechanical Industries, Inc., St. Louis, Mo., a corporation of Missouri Application October 14, 1954, Serial No. 462,308

7 Claims. (Cl. 184—7)

This invention pertains to a pressure lubricating system such as is applied to various types of machines to provide a circulation under pressure of lubricant for several bearings. More particularly, the invention provides for means in such a system adapted to prevent syphoning of the lubricant out of the sysetm when the pressure pump is stopped.

A preferred embodiment of this invention is illustrated in the accompanying drawings in which—

Fig. 1 is a general view in elevation with parts broken away of a machine equipped with a lubricating system in accordance with this invention;

Fig. 2 is a vertical section, diagrammatic in form, of the storage reservoir showing the various pipe connections for supplying oil to the reservoir and for conducting it therefrom to the beaings of the machine; and Fig. 3 is a fragmentary view of the bypass, showing the use of an orifice.

Referring to the drawing, Fig. 1 illustrates one way in which the system may be applied to any type of machine having a plurality of bearings to be lubricated. The machine represented in the drawing is a centrifuge which has several bearings for vertical and horizontal shafts. These bearings are not shown, since they may be of any well known type and provided with oil or other lubricant by means of pipes in any well known manner. As is usual in such machines, the oil drained from the several bearings is collected and conducted by a pipe 1 to a sump 2. The oil is then recirculated by a pump 3 whose suction is connected to the sump 2 and which discharges via a pipe 4 into a storage reservoir 5.

Mounted within the reservoir 5 is a filter 6 through which the oil must pass to reach an outlet pipe 7. In the particular embodiment shown, the pipe 7 is connected by a fitting 8 and a pipe 9 leading to a distribution manifold 10. From the manifold 10, several pipes 11 carry the oil to the bearings. Usually one of these pipes carries oil to each individual bearing. It will be noted that the pipe 7 extends downward into the reservoir 5 to a point near the bottom thereof so that the oil passing out through this pipe is taken from the lower part of the reservoir where the oil is usually cooler than the incoming oil which collects at the top. The holes 7a in the pipe 7 are to prevent clogging.

A difficulty which has been encountered with an installation as so far described, that is, having only the outlet pipes 7, 9 leading to the manifold 10, is that when the pump 3 is stopped as at the end of an operation of the machine, the oil continues to drain from the pipes 11 through the machine, the bearings and into the sump 2. This drainage produces a suction effect which syphons the oil out of the reservoir 5 by way of the pipes 7 and 9. As there is no way for air to get into the reservoir 5, this syphoning may continue until a considerable quantity of oil has been removed from the reservoir. This is not always replaced by the pump when operation is resumed, since the pump usually has a capacity just about sufficient to supply the oil demanded by the bearings, so that the level in the reservoir will build up very slowly, and repeated shutdowns at short intervals may continue to syphon more and more oil from the reservoir.

In order to remedy this condition, and in accordance with this invention, a by-pass is provided from the top of the reservoir 5 to the fitting 8. This by-pass is provided by a small pipe 12 connected between the top of the reservoir and a top branch of the fitting 8 as shown in Fig. 2. A check valve 13 is inserted in the pipe 12. As shown in Fig. 2, the pipe 12 is connected to the top of the reservoir 5 inside of the filter 6, that is, on the same side of the filter as the outlet pipe 7. It has been found that with this arrangement, since there is always a little air entrapped in the top of the reservoir, when the pump 3 is stopped and the tendency to syphon is set up, this air may flow from the top of the reservoir through the pipe 12 and into the pipe 9 at the fitting 8, thereby breaking the column of oil between the pipe 7 and the manifold 10. As the oil drains out of the pipes 11, this small quantity of air is expanded and its pressure reduced below atmospheric pressure. When this reduction in pressure becomes sufficient to sustain the column of oil in the pipes 11, the drainage from the pipes will cease. With this arrangement, therefore, little or no oil is syphoned from the reservoir 5 so that when the operation of the pump 3 is resumed, it will work against a full reservoir.

It has been found also that if the pipe 12 is unobstructed when operation of the pump 3 is resumed, a flow of oil will be set up in the pipe 12 going from the fitting 8 back to the reservoir and that as a consequence, the flow through the pipe 9 is reduced and it becomes difficult to build up an adequate pressure in the manifold 10. Accordingly, a check valve 13 is placed in the pipe 12, the valve being set so as to check the flow of oil from the fitting 8 back to the reservoir during operation of the pump, but to permit free flow of air in the opposite direction from the reservoir to the fitting 8 when the pump is stopped. By checking the flow of oil from the fitting 8 back to the reservoir, the pressure in the pipe 9 and the manifold 10 can be built up to the desired value so that the supply to the various bearings by the pipes 11 can be maintained under adequate pressure.

It has been found further that the system will work if instead of the check valve 13 a small oriffice is placed in the pipe 12, as at 13a in Fig. 3, which will substantially retard the flow of oil in both directions, but offer little retardation to the flow of air in both directions. More specifically, the small orifice presents a substantial resistance to the flow of a high viscosity liquid such as oil between the pipe 9 and the tank 5 or vice versa while having little effect upon the flow of air between the two members. However, since such a small orifice is likely to become clogged with dirt or foreign matter, it has been found that a check valve gives more reliable service. The orifice 13a per se forms no part of the present invention and is illustrated now to show an alternative form of restriciton which may be employed in the pipe 12.

Various changes may be made in the details of construction, within the scope of the appended claims, without departing from the spirit of this invention. Parts of the invention may be used without the whole and improvements may be added while retaining some or all of the advantages of the invention.

I claim:

1. In a lubricating system for a machine having a plurality of bearings, an oil pump, oil pipes leading to the several bearings, and a sump arranged to receive the oil drained from the bearings and to which sump the suction tube of said pump is connected; a closed oil reservoir, a supply pipe leading from the discharge of said pump to said reservoir to supply a quantity of oil thereto, said bearings being located below the oil level in said reservoir, a delivery pipe leading from said reservoir and extending above the top thereof and connected to the several oil pipes leading to the bearings, means providing a by-pass passage from the top of said reservoir to a point of said delivery pipe substantially at the level of said top of said reservoir, and means restricting flow of oil through said passage in one direction while permitting free flow of air in the opposite direction.

2. In a lubricating system for a machine having a plurality of bearings, an oil pump, oil pipes leading to the several bearings, and a sump arranged to receive the oil drained from the bearings and to which sump the suction tube of said pump is connected; a closed oil reservoir, a supply pipe leading from the discharge of said pump to said reservoir to supply a quantity of oil thereto, said bearings being located below the oil level in said reservoir, delivery pipe means leading from said reservoir and extending above the top thereof and connected to the several oil pipes leading to the bearings, means providing a by-pass passage from the top of said reservoir to a point of said delivery pipe substantially at the level of said top of said reservoir, and means substantially restricting flow of oil through said passage while permitting free flow of air therethrough.

3. In a lubricating system or the like, an oil-circulating pump, a closed reservoir, a supply pipe from the discharge of said pump connected to supply oil to said reservoir, a delivery pipe leading out of the top portion of said reservoir from a point therein below the level of the oil in said reservoir, said delivery pipe being connected to deliver oil to one or more consuming devices at levels below the level of the oil in said reservoir, means providing a by-pass passage from the top of said reservoir to a point of said delivery pipe outside of said reservoir, and means restricting flow of oil through said passage while permitting free flow of air therethrough.

4. In a lubricating system or the like, an oil-circulating pump, a closed reservoir, a supply pipe from the discharge of said pump connected to supply oil to said reservoir, a delivery pipe leading out of the top portion of said reservoir from a point therein below the level of the oil in said reservoir, said delivery pipe being connected to deliver oil to one or more consuming devices at levels below the level of the oil in said reservoir, means providing a by-pass passage connecting the top of said reservoir with a point of said delivery pipe adjacent said top, and means restricting flow of oil through said passage in one direction while permitting free flow of air in the opposite direction.

5. In a lubricating system or the like, an oil-circulating pump, a closed reservoir, a supply pipe from the discharge of said pump connected to supply oil to said reservoir, delivery pipe means extending from below the level of oil in said reservoir and connected to one or more consuming devices positioned at levels below the level of oil in said reservoir, means providing a by-pass passage from the top of said reservoir to a point of said delivery pipe outside of said reservoir, and means for restricting flow of oil through said passage while permitting free flow of air therethrough.

6. The combination in accordance with claim 5 wherein said means for restricting comprises a one-way valve connected to permit flow of fluids in a direction from said reservoir to said delivery pipe means.

7. The combination in accordance with claim 5 wherein said means for restricting comprises an orifice.

References Cited in the file of this patent
UNITED STATES PATENTS

| | | |
|---|---|---|
| 767,047 | Essex | Aug. 9, 1904 |
| 2,439,954 | Tercho | Apr. 20, 1948 |

FOREIGN PATENTS

| | | |
|---|---|---|
| 26,728 | Great Britain | of 1906 |